(12) United States Patent
Kim

(10) Patent No.: US 9,751,570 B2
(45) Date of Patent: Sep. 5, 2017

(54) FRONT VEHICLE BODY STRUCTURE

(71) Applicant: Hyundai Motor Company, Seoul (KR)

(72) Inventor: Heeju Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/931,348

(22) Filed: Nov. 3, 2015

(65) Prior Publication Data

US 2017/0021866 A1     Jan. 26, 2017

(30) Foreign Application Priority Data

Jul. 24, 2015   (KR) .................. 10-2015-0105337

(51) Int. Cl.
| | |
|---|---|
| *B62D 25/08* | (2006.01) |
| *B62D 21/15* | (2006.01) |
| *B62D 21/03* | (2006.01) |
| *B62D 25/14* | (2006.01) |

(52) U.S. Cl.
CPC ........... *B62D 25/082* (2013.01); *B62D 21/03* (2013.01); *B62D 21/152* (2013.01); *B62D 25/14* (2013.01)

(58) Field of Classification Search
CPC .......... B62D 3/12; B62D 3/14; B62D 21/152; B62D 21/18; B62D 23/00; B62D 23/005; B62D 25/082; B62D 25/085; B62D 25/088; B62D 21/11; B62D 25/2018
See application file for complete search history.

(56) References Cited

U.S. PATENT DOCUMENTS

| | | | | |
|---|---|---|---|---|
| 5,078,230 A | * | 1/1992 | Hasuike ................... | B60K 5/04 180/291 |
| 5,195,780 A | * | 3/1993 | Inoue ..................... | B60K 15/03 280/830 |
| 5,372,216 A | * | 12/1994 | Tsuji ...................... | B60G 99/00 180/274 |
| 5,429,388 A | * | 7/1995 | Wheatley ............. | B62D 21/152 180/271 |
| 5,454,453 A | * | 10/1995 | Meyer .................... | B60K 17/00 180/377 |
| 5,605,353 A | * | 2/1997 | Moss ..................... | B62D 21/09 188/376 |
| 5,641,181 A | * | 6/1997 | Galhotra ................ | B60G 99/00 280/771 |
| 5,823,287 A | * | 10/1998 | Chidamparam ....... | B60K 17/00 180/312 |
| 5,887,896 A | * | 3/1999 | Kobayashi ............... | B60G 7/02 280/781 |

(Continued)

FOREIGN PATENT DOCUMENTS

JP            4120238 B2      7/2008

*Primary Examiner* — Paul N Dickson
*Assistant Examiner* — Timothy Wilhelm
(74) *Attorney, Agent, or Firm* — Mintz Levin Cohn Ferris Glovsky and Popeo, P.C.; Peter F. Corless

(57) ABSTRACT

A front vehicle body structure includes: front lower side members extending along a length of a vehicle and located on left and right sides along a width of the vehicle; and a center lower cross reinforcement member extending along the width of the vehicle so as to interconnect middle portions of the left and right front lower side members along the length of the vehicle, where a steering gear box is mounted on the center lower cross reinforcement member.

14 Claims, 13 Drawing Sheets

(56) References Cited

U.S. PATENT DOCUMENTS

| | | | | |
|---|---|---|---|---|
| 5,897,139 | A * | 4/1999 | Aloe | B60G 7/02 280/781 |
| 6,102,416 | A * | 8/2000 | Harkrader | B62D 3/12 280/771 |
| 6,189,902 | B1 * | 2/2001 | Lenzen, Jr. | B62D 3/12 280/93.515 |
| 6,193,273 | B1 * | 2/2001 | Novak | B62D 21/00 280/781 |
| 6,269,902 | B1 * | 8/2001 | Miyagawa | B62D 21/11 180/312 |
| 6,354,654 | B2 * | 3/2002 | Lee | B62D 21/02 280/796 |
| 6,428,046 | B1 * | 8/2002 | Kocer | B62D 21/11 180/311 |
| 6,679,545 | B1 * | 1/2004 | Balzer | B62D 25/084 180/68.4 |
| 6,733,040 | B1 * | 5/2004 | Simboli | B62D 21/02 280/784 |
| 6,929,272 | B2 * | 8/2005 | Matsumoto | B62D 21/11 280/124.109 |
| 7,380,829 | B2 * | 6/2008 | Kishima | B62D 21/155 180/232 |
| 7,520,514 | B2 * | 4/2009 | Ogawa | B60G 3/20 180/312 |
| 7,669,689 | B2 * | 3/2010 | Amada | B62D 3/123 180/443 |
| 7,740,278 | B2 * | 6/2010 | Kakuta | B62D 3/12 280/777 |
| 7,771,137 | B2 * | 8/2010 | Anzai | B62D 21/11 180/232 |
| 7,976,037 | B2 * | 7/2011 | Yoshida | B62D 21/11 280/124.109 |
| 8,308,193 | B2 * | 11/2012 | Lux | B62D 21/11 180/299 |
| 8,646,792 | B2 * | 2/2014 | Young | B62D 21/155 280/124.109 |
| 8,745,872 | B2 * | 6/2014 | Hein | B62D 5/22 285/382.2 |
| 9,016,424 | B2 * | 4/2015 | Awano | B62D 3/12 180/274 |
| 9,067,627 | B2 * | 6/2015 | Hara | B62D 21/11 |
| 9,096,276 | B2 * | 8/2015 | Komiya | B62D 21/155 |
| 9,139,229 | B2 * | 9/2015 | Mikami | B62D 21/11 |
| 9,216,775 | B2 * | 12/2015 | Ohhama | B62D 21/11 |
| 9,428,129 | B2 * | 8/2016 | Crona | B60R 19/34 |
| 2001/0052432 | A1 * | 12/2001 | Yoshioka | B60K 17/344 180/68.3 |
| 2002/0190516 | A1 * | 12/2002 | Henksmeier | B62D 21/11 280/785 |
| 2007/0193383 | A1 * | 8/2007 | Toshima | B62D 5/22 74/388 PS |
| 2011/0062677 | A1 * | 3/2011 | Kudla | B62D 3/12 280/124.109 |
| 2014/0312654 | A1 * | 10/2014 | Komiya | B62D 21/11 296/187.09 |

* cited by examiner

FRONT VEHICLE BODY STRUCTURE

CROSS-REFERENCE TO RELATED APPLICATION

This application claims under 35 U.S.C. §119(a) the benefit of Korean Patent Application No. 10-2015-0105337 filed in the Korean Intellectual Property Office on Jul. 24, 2015, the entire contents of which are incorporated herein by reference.

BACKGROUND (a) Field of the Invention

The present invention relates to a front vehicle body structure, and more particularly, to a front vehicle body structure that allows a steering gear box to be stably mounted and supported.

(b) Description of the Related Art

Generally, a vehicle's front body is a frame structure that is positioned at a front along a length of a vehicle and forms an engine room. The vehicle's front body includes a front end module forming the front of the engine room, on which a cooling module, a head lamp, etc. are mounted, front fender apron members that form left and right sides of the engine room and provide a space where a suspension is mounted and wheels are installed, and a dash panel that is positioned at a rear of the engine room and separates a passenger side from the engine room.

Also, front side members extending along the length of the vehicle are located on left and right sides of the vehicle, under the engine room, to increase the structural rigidity of the front vehicle body, and a sub-frame is located under the front side members and connected to them so that the suspension, etc., as well as an engine and transmission installed in the engine room, can be mounted and supported on them.

Meanwhile, so-called high-performance vehicles tend to come with lightweight bodies in order to improve the vehicle's driving performance, and their vehicle bodies are usually manufactured by interconnecting space frames made from aluminum, which is lighter than steel, to make the vehicle bodies lightweight.

There is a need to improve the stability of a steering gear box mounting and the stability of vehicle steering by mounting the steering gear box more stably on the vehicle body made of aluminum space frames.

The above information disclosed in this Background section is only for enhancement of understanding of the background of the invention and therefore it may contain information that does not form the prior art that is already known in this country to a person of ordinary skill in the art.

SUMMARY

An exemplary embodiment of the present invention provides a front vehicle body structure that allows a steering gear box to be more stably mounted and supported on the vehicle body and therefore improves the stability of vehicle steering.

An exemplary embodiment of the present invention provides a front vehicle body structure including: front lower side members extending along a length of a vehicle and located on left and right sides along a width of the vehicle; and a center lower cross reinforcement member extending along the width of the vehicle so as to interconnect middle portions of the left and right front lower side members along the length of the vehicle, wherein a steering gear box may be mounted on the center lower cross reinforcement member.

Front portions of the left and right front lower side members, along the length of the vehicle, may be connected together by a front lower cross reinforcement member extending along the width of the vehicle.

Rear portions of the left and right front lower side members, along the length of the vehicle, may be connected together by a dash lower cross reinforcement member extending along the width of the vehicle.

Corner reinforcement members may be attached to portions connecting the front lower side members and the center lower cross reinforcement member.

The steering gear box may include one or more hydraulic pressure hoses for allowing hydraulic pressure to enter and escape, and the one or more hydraulic pressure hoses may be fastened to and supported on the side of the front lower side members and the side of the center lower cross reinforcement member by one or more ring clips.

The left and right front lower side members may have coupling grooves, respectively, joints may be partially inserted and coupled to the coupling grooves, respectively, the joints may be coupled to the center lower cross reinforcement member, and the steering gear box may be fastened to the joints.

The front lower side members each may have a substantially rectangular box profile, and the rectangular box profile has a sidewall inside so that two or more closed cross-sections separated by the sidewall may be arranged one after the other along the height of the vehicle.

The center lower cross reinforcement member may include: a rectangular box-like reinforcement member body; and one or more side walls formed inside the reinforcement member body and forming two or more closed cross-sections.

The center lower cross reinforcement member may have an upper protruding portion forming a closed cross-section of the reinforcement member body.

The upper protruding portion may have a mounting groove where the steering gear box is partially inserted and mounted.

The joints each may include: a joint body having a rectangular plate shape; an upper flange sticking out inwards from the upper edge of the joint body along the width of the vehicle and coupled to the top surface of the front lower side member along the height of the vehicle; and a lower flange sticking out inwards from the lower edge of the joint body along the width of the vehicle and coupled to the bottom surface of the front lower side member along the height of the vehicle.

A front upper side member may be located upwards from the front lower side member along the height of the vehicle, the front lower side member and the front upper side member may be connected together by a front side reinforcement member, and a coupling flange, where one end of the front side reinforcement member is inserted and coupled, may be formed on the upper flange.

The coupling flange may have a U-shaped cross-section and stick out upwards along the height of the vehicle.

The steering gear box may have one or more fastening bosses, and the upper flange may have two extension bosses extending and sticking out inwards along the width of the vehicle, to which the fastening bosses of the steering gear box are fastened.

A coupling groove may be formed between the two extension bosses, and an end portion of the upper protruding portion of the center lower cross reinforcement member may be inserted and coupled to the coupling groove.

The joint body may have two fastening bosses, each with a side fastening hole, raised and spaced apart one after the other along the length of the vehicle, and one end of a suspension arm may be fastened and coupled to the two side fastening holes.

The joint body may have a plurality of radiating ribs, which interconnect the two fastening bosses and connect the fastening bosses to the joint body to increase the structural rigidity.

With a front vehicle body structure according to an exemplary embodiment of the present invention, left and right front lower side members extend along the length of the vehicle and are located on the left and right along the width of the vehicle, and front portions of the left and right front lower side members, along the length of the vehicle, are connected together by a front lower cross reinforcement member extending along the width of the vehicle, middle portions thereof are connected together by a center lower cross reinforcement member extending along the width of the vehicle, and rear portions thereof are connected together by a dash lower cross reinforcement member extending along the width of the vehicle. The left and right front lower side members connected together by the three reinforcement members allow for a rigid front vehicle body structure.

As a steering gear box extending along the width of the vehicle is seated on the center lower cross reinforcement member and integrally coupled to it, the steering gear box can be mounted and supported more stably on the rigid front lower vehicle body structure. This improves the stability of steering gear box mounting, leading to an improvement in the stability of vehicle steering.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, an exemplary embodiment of the present invention will be described in detail with reference to the attached drawings.

Figure 1:
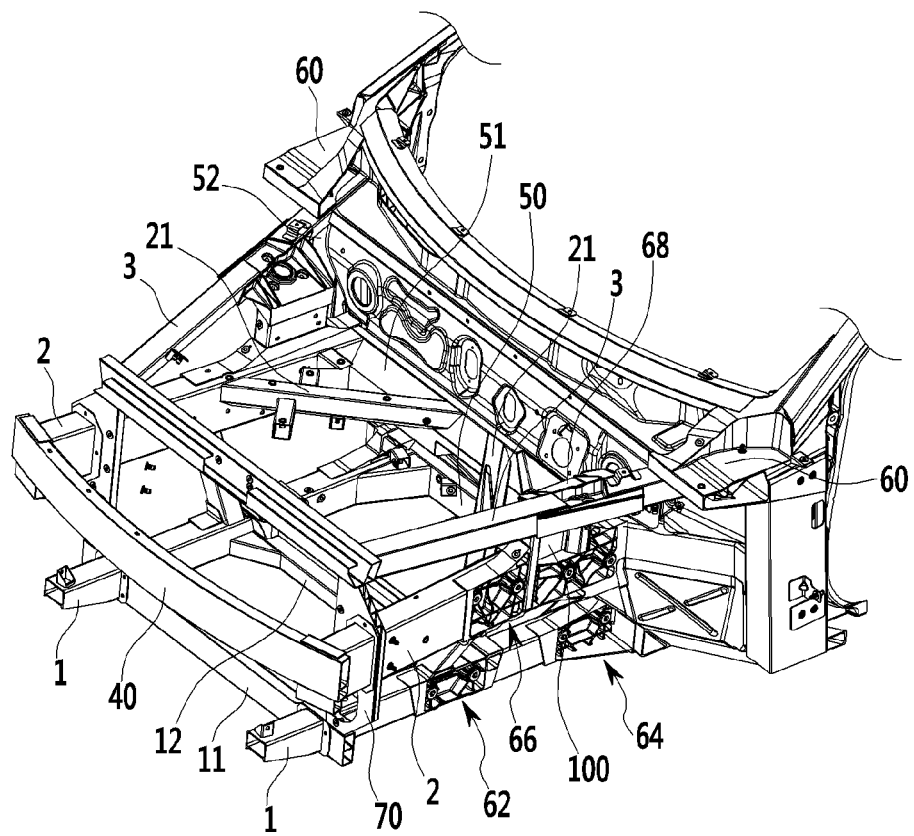
FIG. 1 is a perspective view of a front vehicle body structure according to an exemplary embodiment of the present invention.
Figure 2:
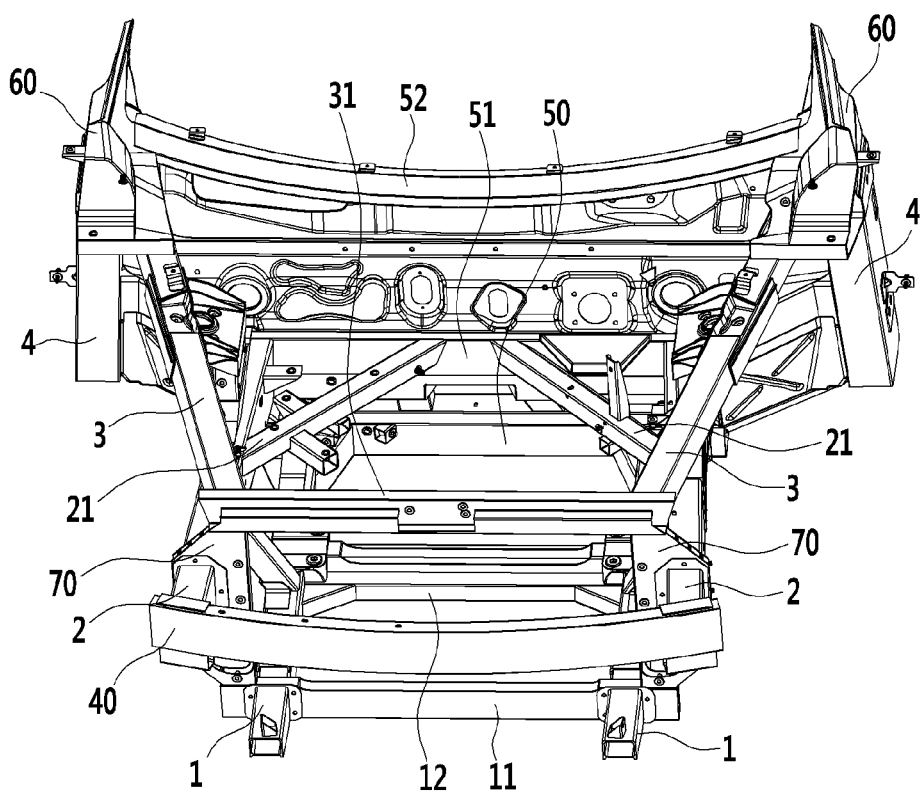
FIG. 2 is another perspective view of the front vehicle body structure according to the exemplary embodiment of the present invention.
Figure 3:
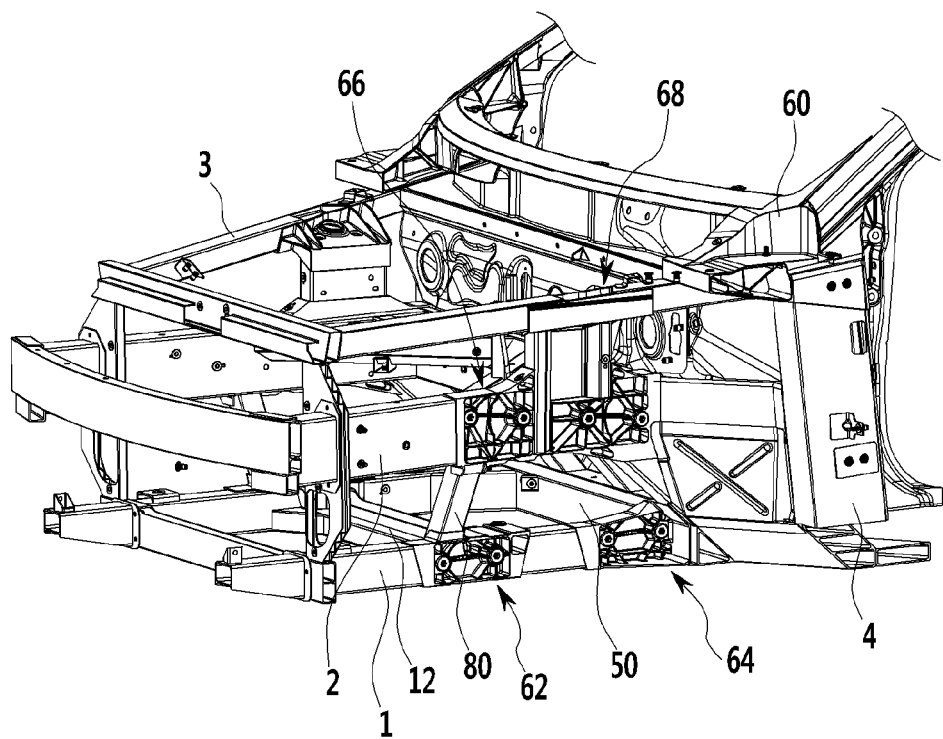
FIG. 3 is yet another perspective view of the front vehicle body structure according to the exemplary embodiment of the present invention.

Referring to FIGS. 1 to 3, a front vehicle body structure according to an exemplary embodiment of the present invention may include front lower side members 1, front upper side members 2, and fender apron upper members 3, which extend along a length of a vehicle.

Along a height of the vehicle, the front lower side members 1 may be located in a lower part, the front upper side members 2 may be located in a middle part, and the fender apron upper members 3 may be located in an upper part.

Front portions of the left and right lower side members 1, along the length of the vehicle, may be connected together by a front lower cross reinforcement member 11 extending along a width of the vehicle, middle portions thereof may be connected together by a center lower cross reinforcement member 12 extending along the width of the vehicle, and rear portions thereof may be connected together by a dash lower cross reinforcement member 50 extending along the width of the vehicle.

Front portions of the left and right front upper side members 2, along the length of the vehicle, may be connected together by a bumper beam 40 extending along the width of the vehicle, and rear portions thereof may be connected together by a dash center cross reinforcement member 51 extending along the width of the vehicle.

The left and right front upper side members 2 and the dash center cross member 51 may be connected together by two slant reinforcement members 21 that run in a slanted manner across the width and length of the vehicle.

The two slant reinforcement members 21 may slant outwards across the width of the vehicle, substantially midway along the length of the dash center cross reinforcement member 51 (along the width of the vehicle), and be attached to the left and right front upper side members 2.

Referring to FIG. 2, the front upper side members 2 may extend further outwards than the front lower side members 1 in the width direction. This enables the front upper side members 2 to properly absorb and reduce impact energy in the event of a small overlap crash, thereby improving small overlap crash performance.

Two front filler members 4 extending along the height of the vehicle may be located on the left and right sides of the width of the vehicle.

Front portions of the left and right fender apron upper members 3, along the length of the vehicle, may be connected together by a front upper cross reinforcement member 31 extending along the width of the vehicle, and rear end portions thereof may be connected to the left and right front filler members 4 through first joints 60.

Both opposite ends of a cowl upper cross reinforcement member 52 extending along the width of the vehicle may be coupled to the left and right first joints 60.

Figure 4:
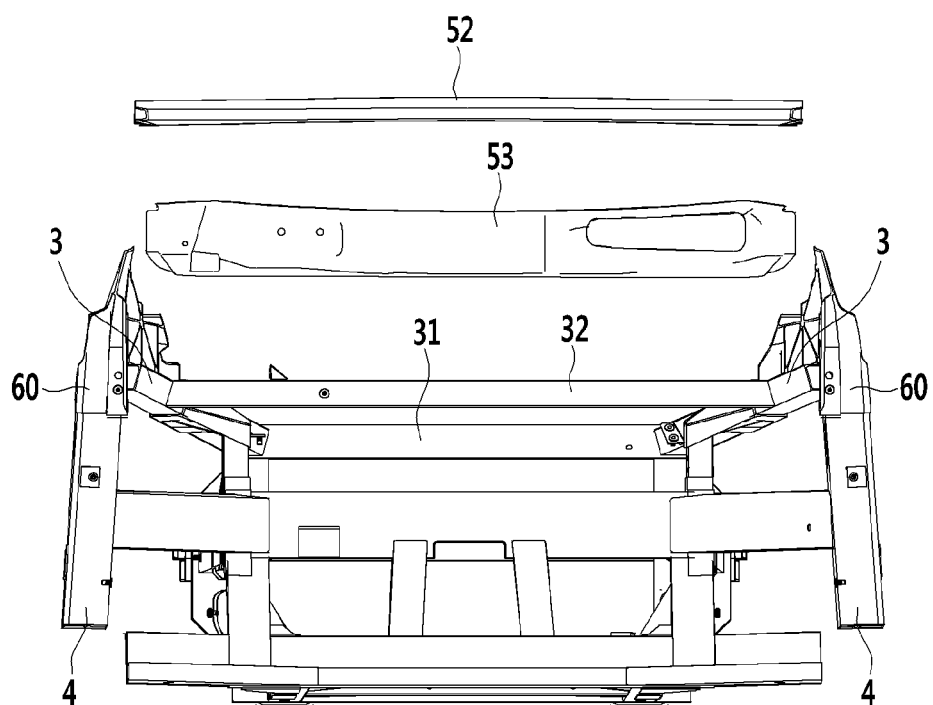
FIG. 4 is a rear exploded perspective view of the front vehicle body structure according to the exemplary embodiment of the present invention.

Referring to FIG. 4, rear portions of the left and right fender apron upper members 3, along the length of the vehicle, may be connected together by a rear upper cross reinforcement member 32 extending along the width of the vehicle, and a cowl panel 53 extending along the width of the vehicle may be interposed between the cowl upper cross reinforcement member 52 and the rear upper cross reinforcement member 32 and integrally coupled to them.

The front lower side members 1, the front upper side members 2, and the fender apron upper members 3 may be connected together by a reinforcement panel 70 extending along the height of the vehicle.

The front lower side members 1 and the front upper side members 2 may be connected together by front side reinforcement members 80 extending along the height of the vehicle, approximately midway along the length of the vehicle.

Second joints 62 may be coupled to portions connecting the front lower side members 1 and the center lower cross reinforcement member 12, third joints 64 may be coupled to portions connecting the front lower side members 1 and the dash lower cross reinforcement member 50, fourth joints 66 may be coupled to the front upper side members 2, and fifth joints 68 may be coupled to the fender apron upper members 3.

The first to fifth joints 60 to 68 may be made from aluminum, for example, by die-casting.

Figure 5:
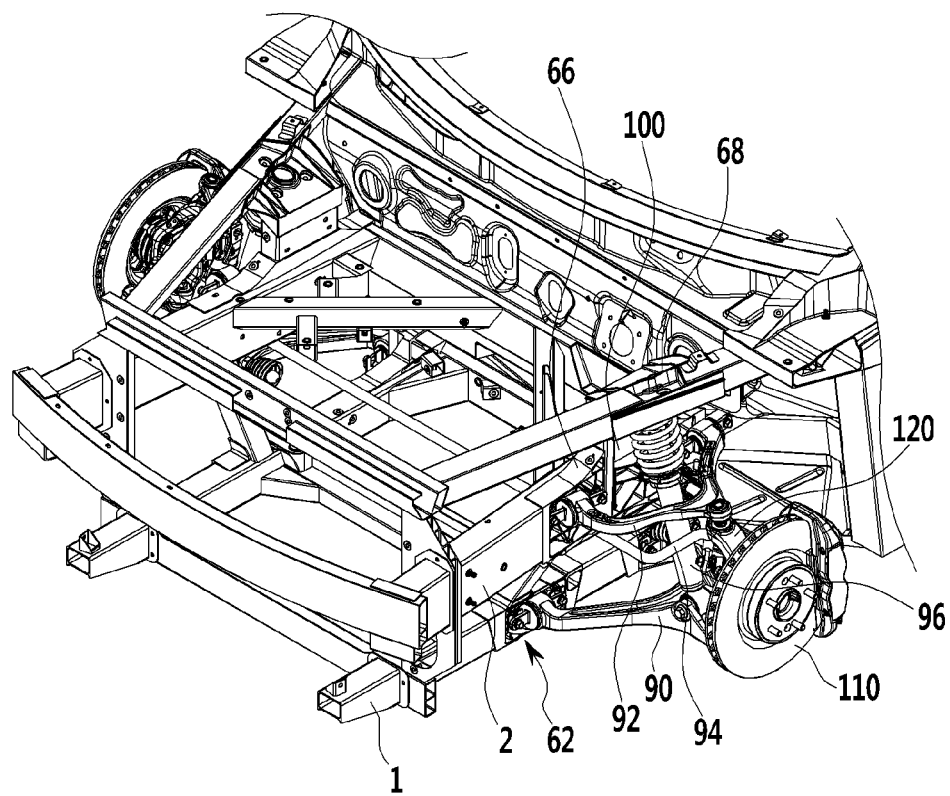
FIG. 5 is a perspective view of a suspension mounted on the front vehicle body structure according to the exemplary embodiment of the present invention.

Referring to FIG. 5, two opposite ends of lower arms 90 constituting suspension arms may be fastened to and supported on the second joints 62 and the third joints 64, respectively, two opposite ends of upper arms 92 constituting the suspension arms may be fastened to and supported on the fourth joints 66, and stabilizer bars 94, which extend along the width of the vehicle and control the moment behavior of the vehicle body, may be fastened to and supported on the fourth joints 66.

The fourth and fifth joints 66 and 68 may be connected together by shock absorber-mounted reinforcement members 100, and the top of the shock absorbers 96 may be fastened to and supported on the fifth joints 68. Reference numeral 110 indicates brake discs for braking wheels (not shown), and reference numeral 120 indicates knuckles for steering the wheels. The lower arms 90 and the upper arms 92 may be fastened to and supported on the knuckles 120.

Figure 6:
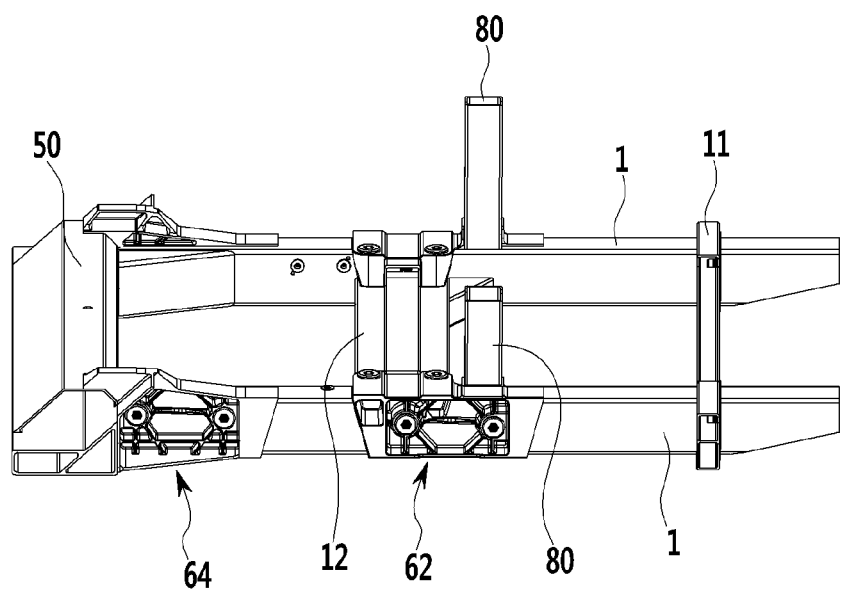
FIG. 6 is a perspective view of front lower side members and their reinforcement members, in the front vehicle body structure according to the exemplary embodiment of the present invention.
Figure 7:
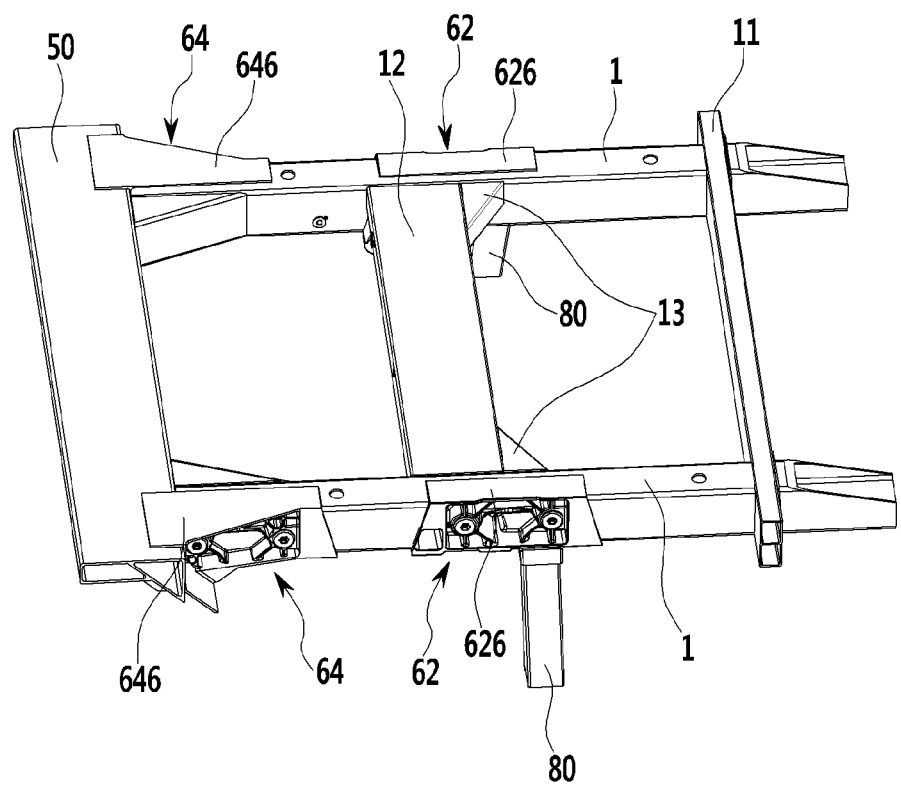
FIG. 7 is a bottom perspective view of FIG. 6.

Referring to FIGS. 6 and 7, the second joints 62 may be coupled to the front lower side members 1 and the center lower cross reinforcement member 12, and the third joints 64 may be coupled to the front lower side members 1 and the dash lower cross reinforcement member 50.

Corner reinforcement members 13 with a substantially triangular shape may be attached to the portions connecting the center lower cross reinforcement member 12 and the front lower side members 1, in order to provide a much more rigid connection.

Figure 8:
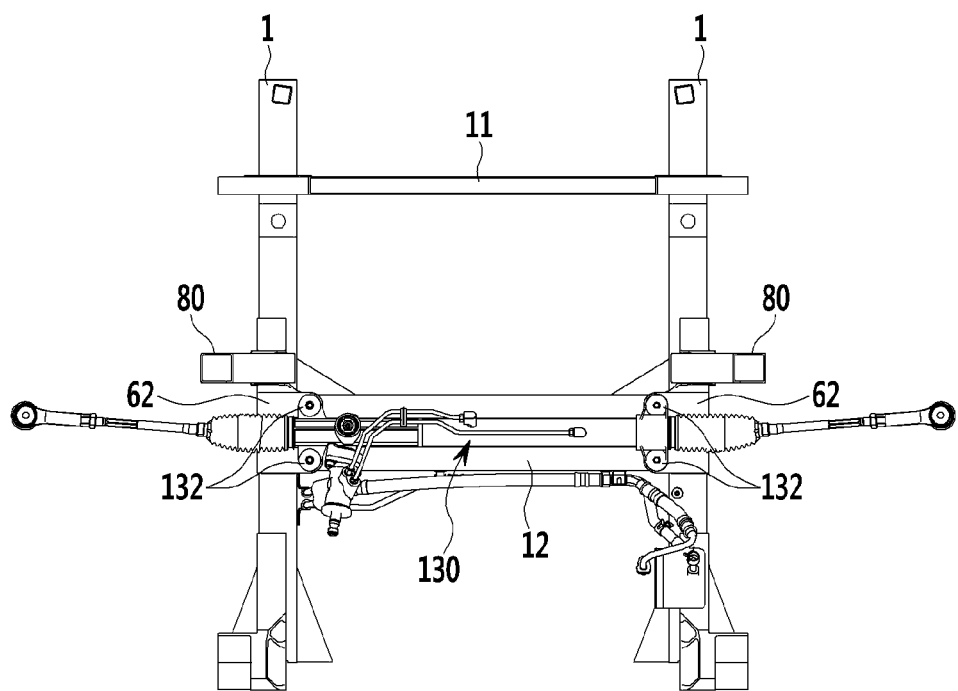
FIG. 8 is a perspective view of a steering gear box mounted on the front lower side members and the center lower cross reinforcement member, in the front vehicle body structure according to the exemplary embodiment of the present invention.
Figure 9:
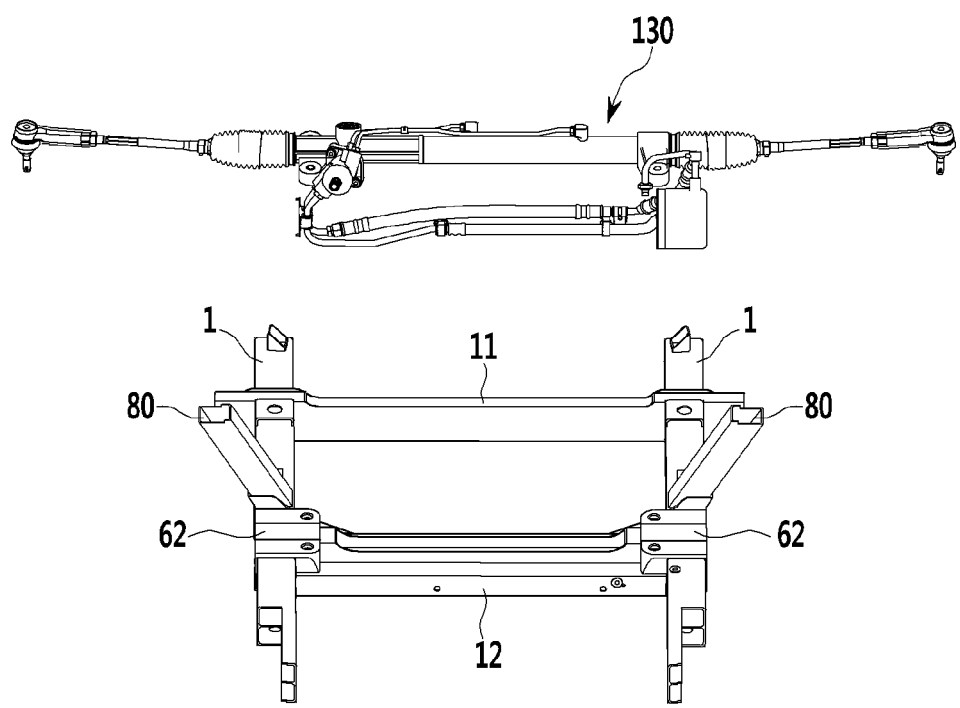
FIG. 9 is an exploded perspective view of FIG. 8.
Figure 10:
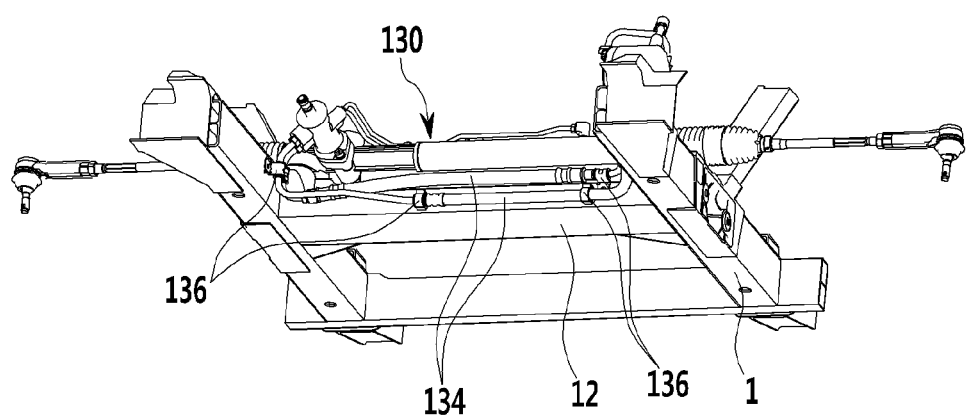
FIG. 10 is a bottom perspective view of FIG. 8.

Referring to FIGS. 8 to 10, the steering gear box 130 may be mounted on the center lower cross reinforcement member 12 and fixedly supported on it. That is, the steering gear box 130 may extend along the width of the vehicle, and be seated atop the center lower cross reinforcement member 12 and mounted in such a way as to protrude further along the width of the vehicle.

The steering gear box 130 may have one or more fastening bosses 132 that are to be fastened to the center lower cross reinforcement member 12.

Also, the steering gear box 130 may include two hydraulic pressure hoses 134 for allowing hydraulic pressure to enter and escape. The two hydraulic pressure hoses 134 may be fastened to and supported on the side of the front lower side members 1 and the side of the center lower cross reinforcement member 12 by one or more ring clips 136.

Figure 11:
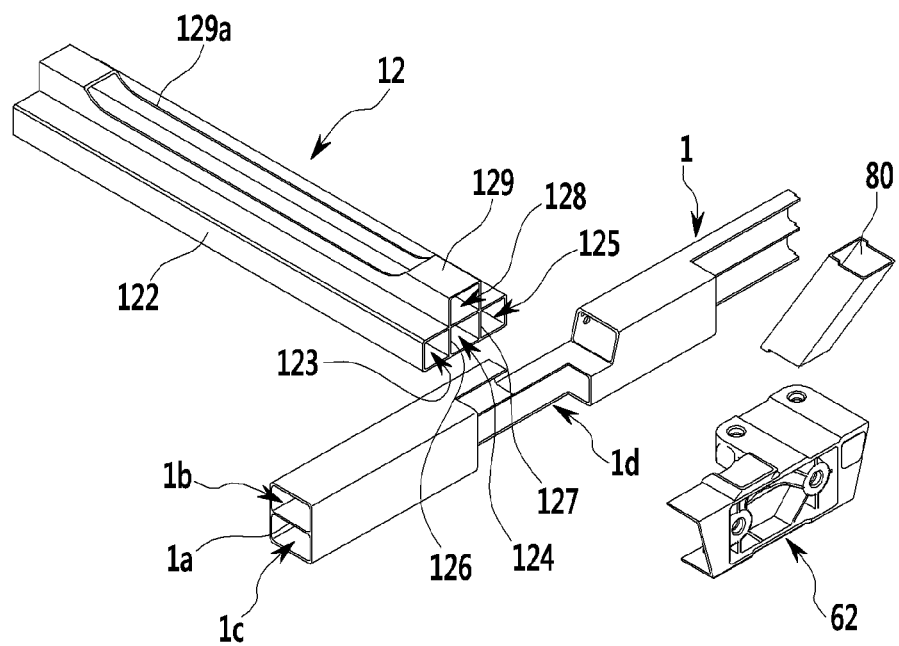
FIG. 11 is an exploded perspective view of one of the front lower side members, the center lower cross reinforcement member, and a second joint, in the front vehicle body structure according to the exemplary embodiment of the present invention.

Referring to FIG. 11, the center lower cross reinforcement member 12 may include a rectangular box-like reinforcement member body 122, and two first and second side walls 126 and 127 formed inside the reinforcement member body 122 and forming three first, second, and third closed cross-sections 123, 124, and 125.

The first and second closed cross-sections 123 and 124 may be separated by the first wall 126 shared by them, the second and third closed cross-sections 124 and 125 may be separated by the second wall 127 shared by them, and the first, second, and third closed cross-sections may be arranged one after the other along the length of the vehicle.

The three first, second, and third closed cross-sections 123, 124, and 125 may increase the structural rigidity of the center lower cross reinforcement member 12.

An upper protruding portion 129 may be formed above the second closed cross-section 124 in such a way as to extend from a fourth closed cross-section 128, in order to increase the rigidity of the upper part of the center lower cross reinforcement member 12, and a combination of the upper protruding portion 129 forming the fourth closed cross-section 128 and the reinforcement member body 122 including the three, first, second, and three closed cross-sections 123, 124, and 125 can improve the stability of mounting of the steering gear box 130.

The upper protruding portion 129 may have a mounting groove 129a where the steering gear box 130 can be partially inserted and mounted.

Although the exemplary embodiment of the present invention has been described by taking three closed cross-sections as an example, the center lower cross reinforcement member 12 may be made to have one closed cross-section or two or more closed cross-sections.

The front lower side members 1 each have a substantially rectangular box profile, and the rectangular box profile has a sidewall 1a inside so that two closed cross-sections 1b and 1c separated by the sidewall 1a may be arranged one after the other along the height of the vehicle.

The front lower side members 1 may have coupling grooves 1d, respectively, where the second joints 62 are partially inserted and coupled. When the second joints 62 are partially inserted and coupled to the coupling grooves 1d in such a manner that blocks the coupling grooves 1d, the rigidity of the connection between the second joints 62 and the front lower side members 1 may be increased.

Figure 12:
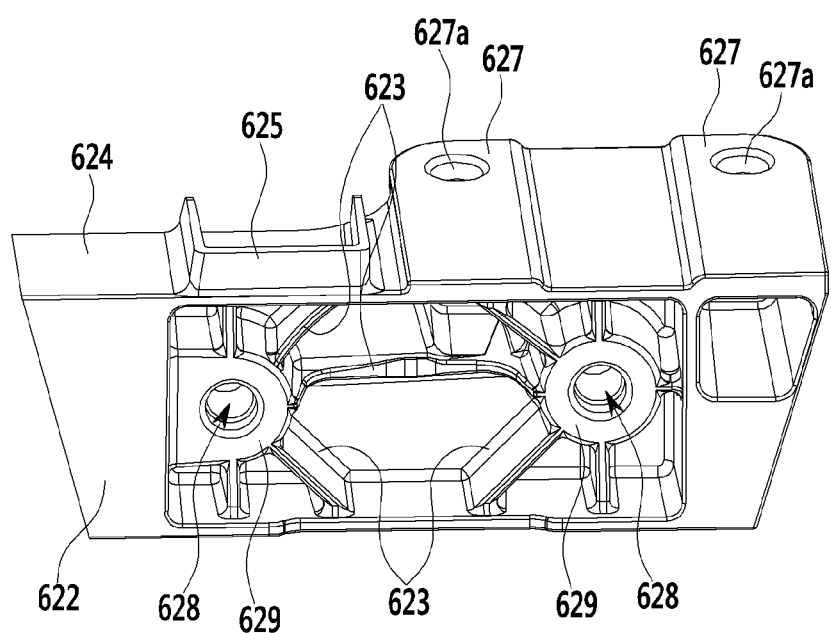
FIG. 12 is a perspective view of the second joint in the front vehicle body structure according to the exemplary embodiment of the present invention.
Figure 13:
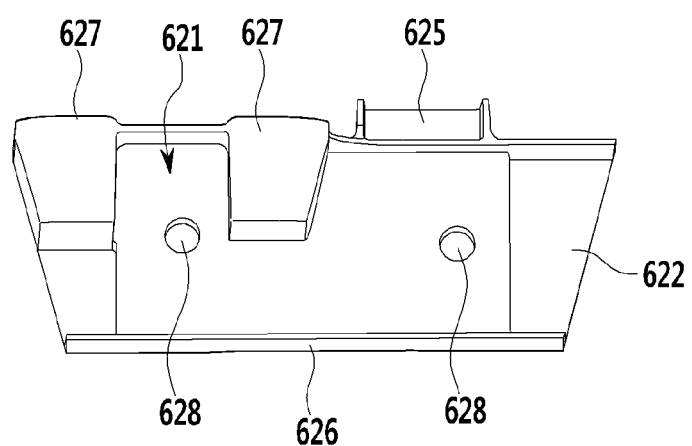
FIG. 13 is another perspective view of the second joint in the front vehicle body structure according to the exemplary embodiment of the present invention.

Referring to FIG. 12, the second joint 62 may include a second joint body 622 having a substantially rectangular plate shape, an upper flange 624 sticking out inwards from the upper edge of the second joint body 622 along the width of the vehicle and coupled to the top surface of the front lower side member 1 along the height of the vehicle, and a lower flange 626 (see FIG. 7) sticking out inwards from the lower edge of the second joint body 622 along the width of the vehicle and coupled to the bottom surface of the front lower side member 1 along the height of the vehicle.

A coupling flange 625 having a substantially U-shaped cross-section, where one end of the front side reinforcement member 80 is inserted and coupled, may be formed on the upper flange 624, sticking out upwards along the height of the vehicle, and the upper flange 624 may also include two extension bosses 627 extending further inwards along the width of the vehicle, to which the fastening bosses 132 of the steering gear box 130 are to be fastened.

Each extension boss 627 may have an upper fastening hole 627a where a fastening bolt (not shown) is inserted and fastened.

A coupling groove 621 having a substantially U-shaped cross-section may be formed between the two extension bosses 627, and an end portion of the upper protruding portion 129 of the center lower cross reinforcement member 12 may be inserted and coupled to the coupling groove 621.

The second joint body 622 may have two fastening bosses 629, each with a side fastening hole 628, raised and spaced apart one after the other along the length of the vehicle, and one end of the lower arm 90 may be fastened and coupled to the two side fastening holes 628.

A plurality of radiating ribs 623, sticking out of the second joint body 622, may be formed integrally with the second joint body 622, which interconnect the two fastening bosses 629 and connect the fastening bosses 629 to the second joint body 622 to increase the structural rigidity.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A front vehicle body structure, comprising:
    front lower side members extending along a length of a vehicle and located on left and right sides along a width of the vehicle; and
    a center lower cross reinforcement member extending along the width of the vehicle so as to interconnect middle portions of the left and right front lower side members along the length of the vehicle,
    wherein a steering gear box is mounted on the center lower cross reinforcement member, and
    wherein the center lower cross reinforcement member comprises:
        a rectangular reinforcement member body;
        one or more side walls formed inside the reinforcement member body and forming two or more closed cross-sections; and
        an upper protruding portion forming one of the closed cross-sections, the upper protruding portion having a mounting groove where the steering gear box is partially inserted and mounted.

2. The front vehicle body structure of claim 1, wherein front portions of the left and right front lower side members, along the length of the vehicle, are connected together by a front lower cross reinforcement member extending along the width of the vehicle.

3. The front vehicle body structure of claim 1, wherein rear portions of the left and right front lower side members, along the length of the vehicle, are connected together by a dash lower cross reinforcement member extending along the width of the vehicle.

4. The front vehicle body structure of claim 1, wherein corner reinforcement members are attached to portions connecting the front lower side members and the center lower cross reinforcement member.

5. The front vehicle body structure of claim 1,
    wherein the steering gear box comprises one or more hydraulic pressure hoses for allowing hydraulic pressure to enter and escape, and
    the one or more hydraulic pressure hoses are fastened to and supported on the side of the front lower side members and the side of the center lower cross reinforcement member by one or more ring clips.

6. The front vehicle body structure of claim 1,
    wherein the front lower side members each have a substantially rectangular box profile, and
    the rectangular box profile has a sidewall inside so that two or more closed cross-sections separated by the sidewall are arranged one after the other along the height of the vehicle.

7. The front vehicle body structure of claim 1,
    wherein the left and right front lower side members have coupling grooves, respectively,
    joints are partially inserted and coupled to the coupling grooves, respectively,
    the joints are coupled to the center lower cross reinforcement member, and
    the steering gear box is fastened to the joints.

8. The front vehicle body structure of claim 7, wherein the joints each comprise:
    a joint body having a rectangular plate shape;
    an upper flange sticking out inwards from an upper edge of the joint body along the width of the vehicle and coupled to a top surface of the front lower side member along the height of the vehicle; and a lower flange sticking out inwards from a lower edge of the joint body along the width of the vehicle and coupled to a bottom surface of the front lower side member along the height of the vehicle.

9. The front vehicle body structure of claim 8, wherein a front upper side member is located upwards from the front lower side member along the height of the vehicle, the front lower side member and the front upper side member are connected together by a front side reinforcement member, and a coupling flange, where one end of the front side reinforcement member is inserted and coupled, is formed on the upper flange.

10. The front vehicle body structure of claim 9, wherein the coupling flange has a U-shaped cross-section and sticks out upwards along the height of the vehicle.

11. The front vehicle body structure of claim 9, wherein the steering gear box has one or more fastening bosses, and the upper flange has two extension bosses extending and sticking out inwards along the width of the vehicle, to which the fastening bosses of the steering gear box are fastened.

12. The front vehicle body structure of claim 11, wherein a coupling groove is formed between the two extension bosses, and an end portion of the upper protruding portion of the center lower cross reinforcement member is inserted and coupled to the coupling groove.

13. The front vehicle body structure of claim 11, wherein the joint body has two fastening bosses, each with a side fastening hole, raised and spaced apart one after the other along the length of the vehicle, and one end of a suspension arm is fastened and coupled to the two side fastening holes.

14. The front vehicle body structure of claim 13, wherein the joint body has a plurality of radiating ribs, which interconnect the two fastening bosses and connect the fastening bosses to the joint body to increase the structural rigidity.

* * * * *